June 23, 1964 M. J. KUTIK 3,138,428
HELIX AND PRESSURE BAR RECORDER
Filed Aug. 11, 1960 2 Sheets-Sheet 1
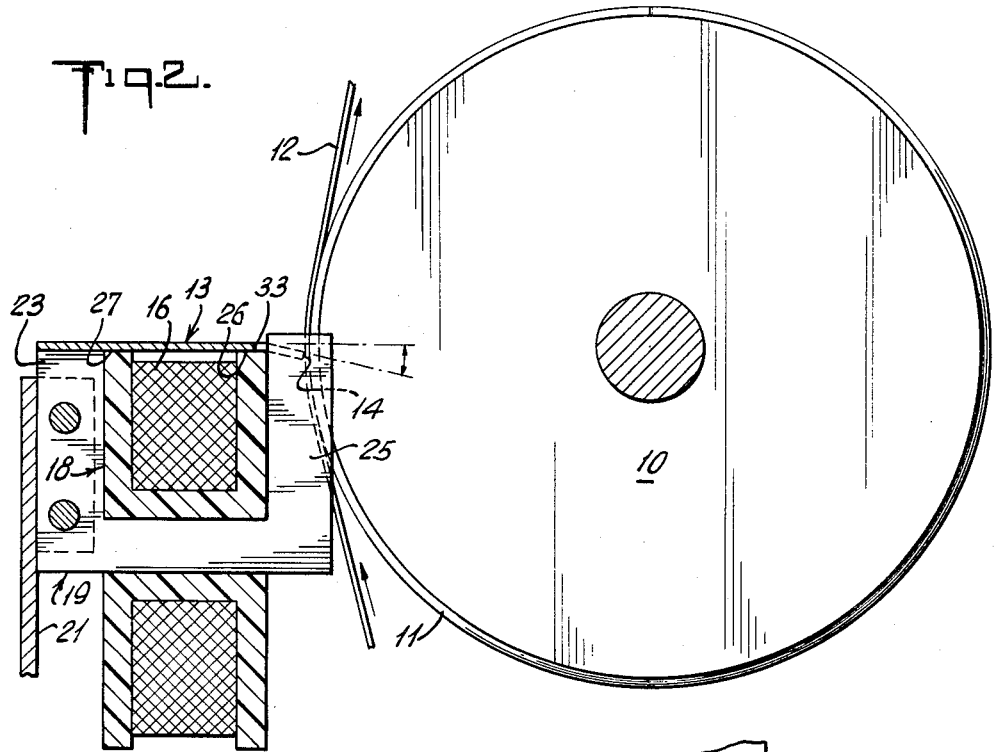
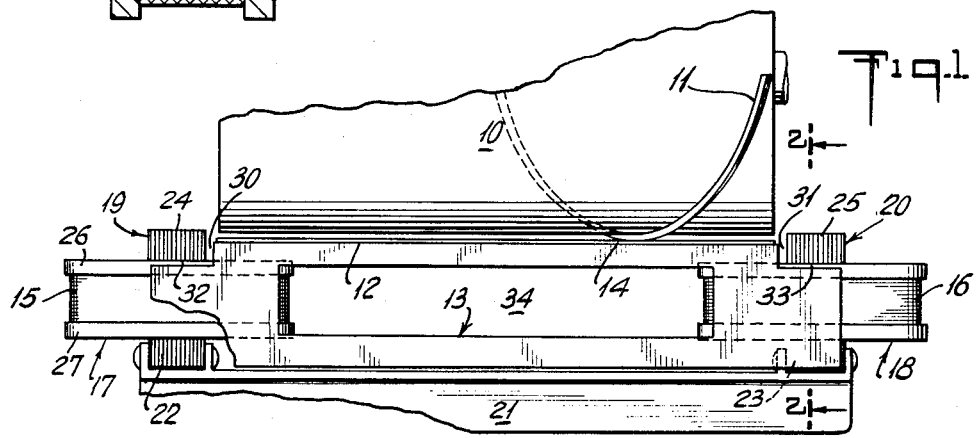
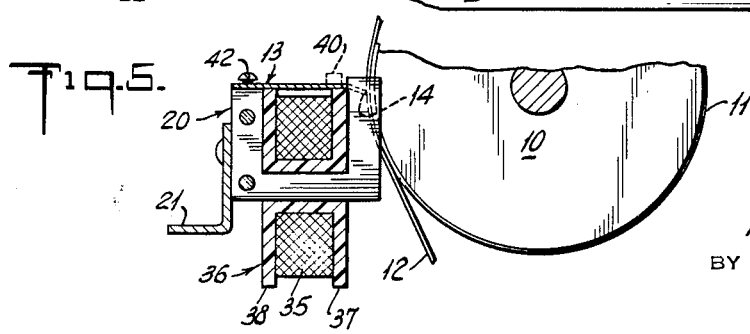
INVENTOR
MARTIN J. KUTIK
BY John J. Rogan
ATTORNEY

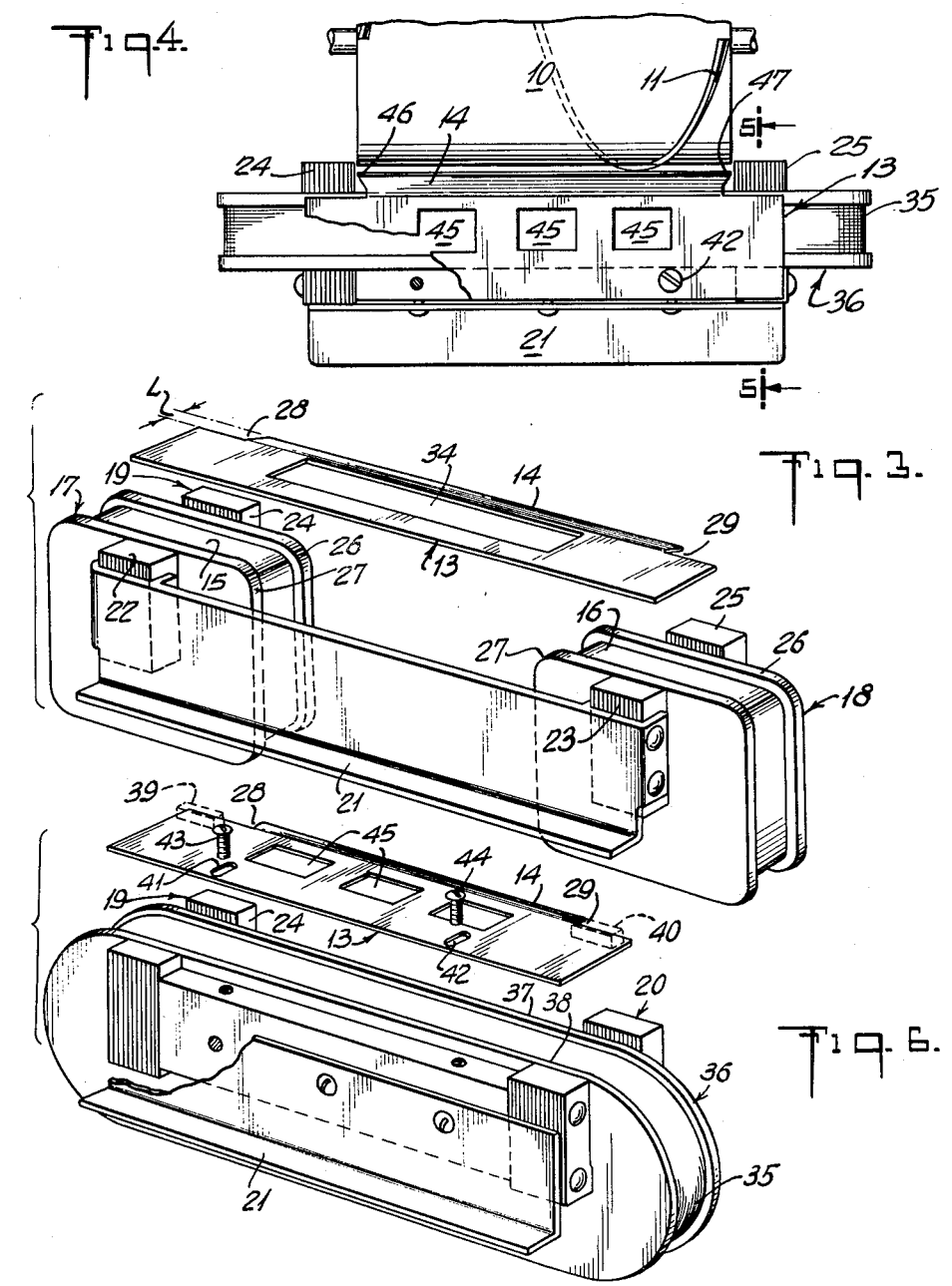

United States Patent Office 3,138,428
Patented June 23, 1964

3,138,428
HELIX AND PRESSURE BAR RECORDER
Martin J. Kutik, New York, N.Y., assignor, by mesne assignments, to Litton Systems, Inc., a corporation of Maryland
Filed Aug. 11, 1960, Ser. No. 48,878
13 Claims. (Cl. 346—101)

This invention relates to recorders and more especially to the visual recording of subject matter represented by electric signals.

A principal object is to provide a novel mechanism for marking recording blanks under control of the variable contact pressure of a recording member.

Another object is to provide an improved recorder of the helix and cooperating pressure bar kind.

A further object is to improve the mechanism and the operation of a facsimile recorder employing pressure-responsive blanks, whereby one, or a multiplicity, of recorded copies can be made simultaneously.

Another object is to improve the structure of operation of a recorder of the kind employing a free-floating pressure exerting marking bar or strip, such for example as disclosed in U.S. application Serial No. 861,529, filed December 23, 1959.

A feature of the invention relates to an improved magnetic system for the recording bar or strip of a recorder of the helix anvil and cooperating pressure bar kind.

A still further feature relates to the novel organization, arrangement and relative location and cooperation of parts which provide an improved recorder.

Other features and advantages not specifically enumerated will be apparent after a consideration of the following detailed descriptions, the appended claims and the attached drawing.

In the drawing:

FIG. 1 is a plan view, with certain parts broken away, showing the structure and relation of the more important elements of a facsimile recorder according to the invention;

FIG. 2 is a sectional view of FIG. 1 taken along the line 2—2 thereof;

FIG. 3 is an exploded perspective view of the marking bar and magnetic system of FIG. 1;

FIG. 4 is a plan view similar to FIG. 1, but illustrating a modification according to the invention;

FIG. 5 is a sectional view of FIG. 4 taken along the line 5—5 thereof;

FIG. 6 is an exploded perspective view of the marking bar and magnetic system of FIGS. 4 and 5.

The invention is in the nature of an improvement on the kind of recorder and recording mechanisms disclosed in the application for U.S. Letters Patent, Serial No. 861,529, filed December 23, 1959. There is disclosed in said application a recorder of the kind employing a rotary platen or helically ribbed drum against which rib is urged the longitudinal edge of an elongated light-weight recording bar or vane which is supported in a substantially unrestrained or "free-floating" manner. The bar or vane, in addition to serving as the actual blank-marking member, also serves directly as the armature of an associated electromagnet which is energized by electric signals to be recorded. The signal energizations of the electromagnet cause the bar or vane to exert corresponding pressure on the recording blank or blanks, which are fed longitudinally past the edge of the recording bar and between that bar and the helical rib on the rotary drum. As a result of the rotation of the drum, the blank is "scanned" in successive elemental areas across each succeeding linear element thereof.

The present invention has for one of its objects an improved organization of the signal-controlled electromagnet and marking bar, whereby the magnetic system is rendered more efficient for recording purposes.

Referring to FIG. 1 of the drawing, the numeral 10 designates a rotary drum or platen which carries on its periphery a helical knife edge or rib 11 to act as an anvil against which the recording blank 12 can be pressed by the recording blade or bar 13. The bar 13 (see FIG. 3) is in the form of a flat thin strip of magnetic material, preferably having its forward margin inclined downwardly as indicated more clearly in FIGS. 2 and 3, to provide a marking knife edge 14 which normally rests against the blank 12. The pressure of edge 14 on the blank is controlled by the signal energization of the associated coils 15, 16, each of which is wound on a suitable insulating bobbin frame 17, 18, preferably, although not necessarily, of hard smooth plastic. The invention is not limited to any particular kind of recording blank provided it is of a type which responds to pressure so as to make a corresponding mark. Typical examples of such pressure-responsive blank are disclosed in Harold R. Dalton U.S. Patents No. 2,313,808 and No. 2,313,810. Each bobbin is provided with a respective U-shaped laminated iron core 19, 20, which are mounted on and spaced apart by a steel yoke 21, and by means of which the assembly can be fastened so as to lie parallel to the longitudinal axis of rotation of drum 10.

The spacing between cores 19 and 20 is slightly greater than the width of drum 10. The upper ends of legs 22, 23 are preferably machined so as to be in the same plane as the upper rims 26, 27 of the respective bobbins; while the corresponding front legs 24, 25 of the cores are above the said rims of the bobbins as shown more clearly in FIG. 2.

The recording blade or bar 13 has its forward ends cut away as indicated at 28 and 29 (see FIG. 3) to provide gaps 30, 31 so that the blade does not rub on the core legs 24, 25; and also to provide smaller gaps 32, 33 across which the magnetomotive force is exerted by the cores on the recording bar. The dimension L of each of the cut-outs 28, 29 is such that when the marking edge 14 is in maximum pressure contact with the blank 12, the gaps 32 and 33 are at their minimum. On the other hand, when the recording edge 14 just touches the blank 12, but without sufficient pressure to cause marking thereof, the gaps 32 and 33 may be about .040 inch, thus allowing the edge 14 to be pressed against the blank 12 without completely closing the gaps 32, 33.

In accordance with the invention, and as explained in said application Serial No. 861,529, filed December 23, 1959, the magnetizable member 13 rests freely and unrestrainedly for sliding motion on the smooth top rims 26, 27 of the bobbins 17, 18. Thus, when coils 15 and 16 are energized by the signals to be recorded, the member 13 is attracted by the forward core legs 24, 25 to correspondingly reduce the gaps 32, 33 and therefore to exert corresponding pressure on the blank 12 at the particular point of intersection between the recording edge 14 and the helical rib 11.

The edge 14 can be held in contact with the blank even though no signals are being applied to the coils 15 and 16, for example by adjusting the yoke 21 on its support so that the cores are tilted very slightly toward the drum 10. However, this normal contact between the edge 14 and the blank is so slight as not to cause any visible marking on the blank. Alternatively, the biasing of the member 13 into the normal light contact with the blank can be achieved by supplying the windings 15, 16 with a normal steady biasing current of insufficient magnitude to cause marking on the blank but the receipt of signals above the said minimum level cause the edge 14 to correspondingly mark the blank. Preferably, in order to reduce the weight and mass of the member 13, it is provided with a cut-out window 34.

The manner of operation of the device for marking the blank 12 will be clear from the foregoing, it being understood that the drum 10 is rotated at a predetermined rate, and likewise the blank 12 is fed in the direction of the arrows at a predetermined rate correlated with the rotation of drum 10.

FIGS. 4, 5 and 6 show a modification wherein, instead of using a pair of separate coils 15 and 16 to actuate the magnetizable member 13, a single elongated coil 35 is wound on a corresponding bobbin 36. The marking member 13 is of the same general construction as that shown in FIGS. 1 to 3, and it is designed to rest freely and unrestrainedly for sliding motion on the upper rims 37, 38 of the bobbin. In order to increase the magnetomotive force, if necessary, between the cores 19, 20 and the member 13, the member 13 may have fastened adjacent its forward edge at the cut-out portions small iron blocks 39, 40. It will be understood, of course, that the same may apply to the embodiments of FIGS. 1 to 3. Preferably, although not necessarily, the member 13 is provided with a pair of elongated slots 41, 42 which act as guides in cooperation with respective pins 43, 44 which are threaded into the yoke 21 to prevent any undesirable sidewise motion of the member 13 during its recording action. The remaining parts of FIGS. 4, 5 and 6 which are the same as those of FIGS. 1 to 3, bear the corresponding designation numerals. It will be observed that in the embodiment of FIG. 4 and FIG. 6, the member 13, instead of being provided with a single window to reduce its mass, may be provided with a series of windows 45 for that purpose. Likewise, in FIG. 4, the end edges of the member 14 are cut away so that the points 46, 47 engage the inner faces of core legs 24, 25, thus positively preventing lengthwise displacement of member 13 while exerting negligible frictional drag on the said member as it moves toward the recording blank.

Various changes and modifications may be made in the disclosed embodiments without departing from the scope of the invention.

What is claimed is:

1. A recorder for marking a recording blank, comprising means to subject the recording blank at the recording point to a signal-controlled pressure to mark the blank correspondingly, the said means including a backing member for the blank, an elongated movable recording member having an edge which extends substantially across the width of said blank and is arranged to exert pressure on said blank, electromagnetic means having a pair of gapped magnetizable cores in magnetomotive gapped relation with the end portions of said member, and signal-controlled windings for said cores to control the pressure of said member on said blank.

2. A recorder for marking a recording blank, comprising means to subject the recording blank at the recording point to a signal-controlled pressure to mark the blank correspondingly, the said means including a ribbed backing anvil for the blank, an elongated movable recording member having a recording edge which is mounted to intersect the rib on said anvil to define a localized recording point on the blank, a pair of electromagnets having separate magnetizable cores mounted adjacent the end portions of said recording member, said recording member resting on said electromagnets and being supported thereby for substantially unrestrained sliding motion toward the adjacent surface of said blank.

3. A recorder according to claim 2 in which said electromagnets are spaced apart a distance greater than the length of said recording edge and supported on a common yoke, whereby said electromagnets are located out of contact with the length of said recording edge and beyond the ends thereof.

4. A recorder according to claim 3 in which each of said electromagnets has an individual core and a respective individual magnetizing winding.

5. A recorder according to claim 3 in which each of said electromagnets has an individual core and a single elongated magnetizing winding for both cores.

6. A recorder according to claim 3 in which each of said electromagnets has an individual magnetic core, and bobbin supported magnetizing windings on said cores, said bobbins having spaced parallel ribs upon which said recording member is freely supported for sliding movement.

7. A recorder for marking a pressure-responsive recording blank, comprising a rotatable anvil having a ribbed surface, a blank-marking member in the form of a thin elongated strip of magnetic material having a recording edge adapted to define with the ribbed surface of said anvil an elemental recording point on the blank when said blank is located between said anvil and recording edge, said marking member having its opposite longitudinal corners cut away to define said recording edge therebetween, a pair of electromagnet cores each located respectively in registry with said cut away portions at the ends of said member and defining therewith respective magnetic gaps located at the ends of said member, and magnetizing coil means for said cores and upon which said member is freely slidable to cause said recording edge to exert corresponding marking pressure on said blank.

8. A recorder for marking a pressure-responsive recording blank, comprising a helically ribbed rotatable anvil, an elongated strip of magnetic material extending parallel to the longitudinal axis of said anvil, said strip having a recording edge extending across the width of the blank when said blank is located for feeding movement between said rib and said recording edge, the ends of said member extending beyond the edges of the blank, a pair of electromagnets each having an individual magnetic core in gapped relation to a respective end of said member, signal energizing magnetizing winding means for said cores, and means to support said member for free sliding movement with respect to said cores to vary the said gapped relation and thereby to control the pressure of said member on the recording blank.

9. A recorder according to claim 8, in which each of said cores is U-shaped and is provided with a respective winding bobbin having rims on which said member is slidably supported.

10. A recorder for marking a recording blank, comprising means to subject the recording blank at the recording point to a signal controlled pressure to mark the blank correspondingly, the said means including a backing member for the blank, an elongated movable recording member in the form of a strip having an edge which is arranged to exert pressure on said blank, said member having at least one notched section offset with relation to said edge, and signal energized electromagnetic core means in registry with said notched section for exerting an electromagnetic attraction on said recording member to effect said pressure.

11. A recorder according to claim 10 in which said recording member has a pair of notched sections at opposite ends thereof, and said electromagnetic core means has portions in registry with each of said notched sections.

12. A recording member for recording devices comprising an elongated member having a substantially linear blank-marking edge, said recording member having a notched section at each end offset with respect to said edge and arranged to be subjected to electromagnetic traction in response to electric signals to be recorded.

13. A recorder for marking a recording blank, comprising means to subject the recording blank to signal controlled pressure to mark the blank correspondingly, the said means including a backing member for the blank, an elongated movable recording member in the form of a strip which is movable edgewise to exert pressure on said blank along the edge of the strip, said recording member being notched at both ends at said edge, and electromagnetic means disposed in said notches for actuating said recording member by magnetic attraction of said member.

References Cited in the file of this patent
UNITED STATES PATENTS

| | | |
|---|---|---|
| 2,380,467 | Ressler | July 31, 1945 |
| 2,729,818 | Bell et al. | Jan. 10, 1956 |
| 2,785,039 | Artzt | Mar. 12, 1957 |